United States Patent [19]
Lee

[11] Patent Number: 5,995,587
[45] Date of Patent: Nov. 30, 1999

[54] METHOD OF CONTROLLING TIME SWITCH FOR DIAGNOSING FAILURE ON CALL PATH

[75] Inventor: Sang-Mok Lee, Yongin, Rep. of Korea

[73] Assignee: Samsung Electronics Co., Ltd., Rep. of Korea

[21] Appl. No.: 08/950,393

[22] Filed: Oct. 14, 1997

[30] Foreign Application Priority Data

Jan. 17, 1997 [KR] Rep. of Korea .......................... 97-1237

[51] Int. Cl.⁶ .................................................. H04M 1/24
[52] U.S. Cl. .................................................. 379/5; 379/27
[58] Field of Search ..................... 379/1, 4–5, 9, 379/12, 14–15, 17, 22–23, 26, 27–28; 370/241, 242, 244–245, 247–249, 250–251

[56] References Cited

U.S. PATENT DOCUMENTS

| | | | |
|---|---|---|---|
| 4,736,402 | 4/1988 | Landis | 379/16 |
| 4,908,819 | 3/1990 | Casady et al. | 370/15 |
| 5,265,089 | 11/1993 | Yonehara | 370/249 |
| 5,410,585 | 4/1995 | Kawaharata | 379/27 |
| 5,479,473 | 12/1995 | Zey | 379/16 |
| 5,659,570 | 8/1997 | Cotreau et al. | 379/5 |
| 5,848,127 | 12/1998 | Levitan et al. | 379/5 |

*Primary Examiner*—Curtis A. Kuntz
*Assistant Examiner*—Duc Nguyen
*Attorney, Agent, or Firm*—Dilworth & Barrese

[57] ABSTRACT

A time switch is disposed between a calling terminal and a called terminal to changeably form a communication loop with respect to an established call, so as to determine the origin of a call failure. For example, when only the calling party hears a voice from the called party, and the called party may not hear any voice, the time switch connects the output of the calling party to the input of the calling party itself to determine whether or not the calling party can hear their own voice. If the calling party can hear their voice, it will be determined that the call failure does not originate from the calling party. The time switch then connects the output of the called party to the input of the called party itself to determine whether or not the called party can hear their own voice. If the called party can not hear their voice, it will be determined that the call failure originated from the called party.

3 Claims, 2 Drawing Sheets

METHOD OF CONTROLLING TIME SWITCH FOR DIAGNOSING FAILURE ON CALL PATH

BACKGROUND OF THE INVENTION

1. Field of the Invention

The present invention relates to data communication between terminals, and more particularly to a method for controlling a time switch placed between a calling terminal and a called terminal.

2. Description of the Related Art

A data communication system generally includes a time switch placed between the calling party and the party being called. In a normal case, in order to establish a call between the calling terminal and the called terminal, the time switch connects an output of the calling party to an input of the called party, and vice versa. Conventionally, once established, the communication path will be fixedly maintained while processing the call.

However, in case of a call failure in the course of processing the call (e.g., a unidirectional communication or a generation of noises), since the conventional time switch fixedly maintains the call connection status, it is difficult to determine where the failure originated (i.e., from the calling party or from the called party).

SUMMARY OF THE INVENTION

It is therefore an object of the present invention to provide a method of controlling a time switch placed between a calling terminal and a called terminal to variably form a communication loop with respect to an established call, so as to determine the place from which a failure originated.

According to an illustrative embodiment of the invention, a method for controlling a time switch disposed between a first terminal and a second terminal is provided. The time switch switches a first resource associated with the first terminal and a second resource associated with the second terminal with respect to an established call, to diagnose a system so as to determine a place from which a call failure originated. The method includes connecting an output of the first resource to an input of the first resource and to an input of the second resource; connecting an output of the second resource to the input of the second resource and to the input of the first resource; and connecting the output of the first resource to the input of the first resource, and connecting the output of the second resource to the input of the second resource.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENTS

Figure 1:
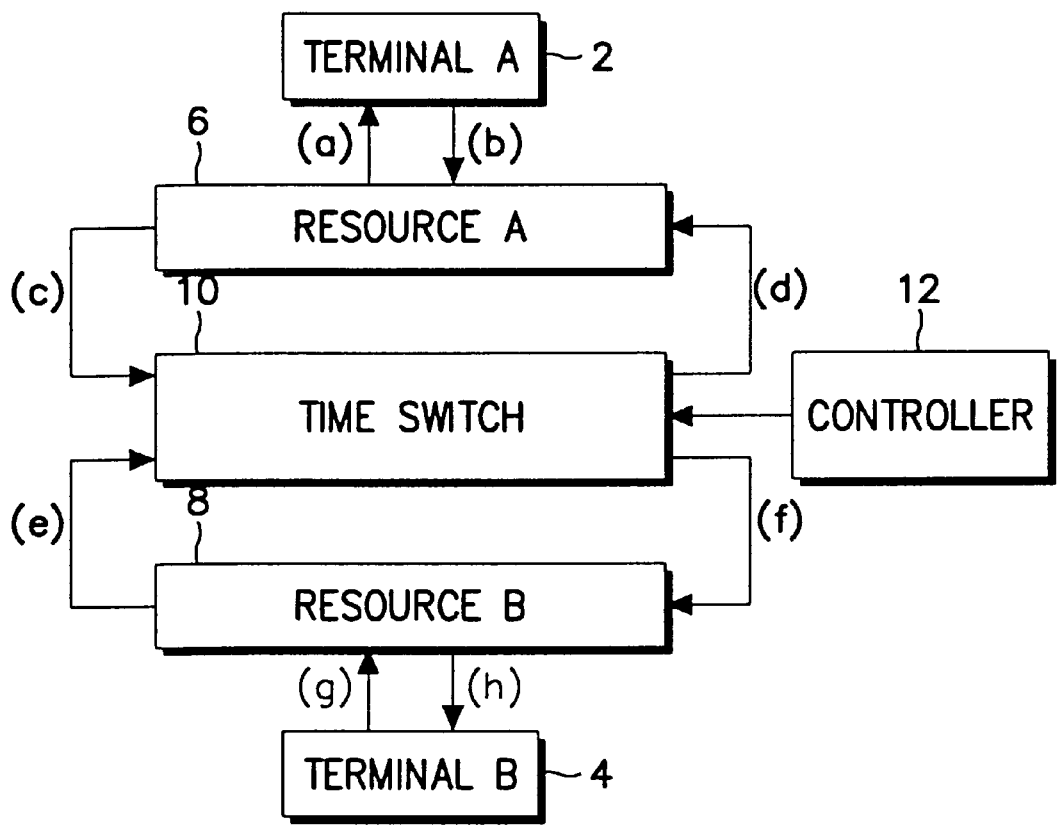
FIG. 1 is a partial block diagram of a data communication system to which the present invention is applicable.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

FIG. 1 illustrates a partial block diagram of a data communication system to which the present invention is applicable. As illustrated, first and second resources 6 and 8 are respectively associated with first and second terminals 2 and 4. The first and second resources 6 and 8 are mutually connected to each other by a time switch 10. A controller 12 controls the time switch 10. In the drawing, outputs (a) and (h) from the first and second resources 6 and 8, respectively, are applied to the first and second terminals 2 and 4, respectively. Outputs (b) and (g) from the first and second terminals 2 and 4 are applied to the first and second resources 6 and 8, respectively. Further, outputs (c) and (e) from the first and second resources 6 and 8 are applied to the time switch 10, and outputs (d) and (f) from the time switch 10 are applied to the first and second resources 6 and 8, respectively.

Figure 2:
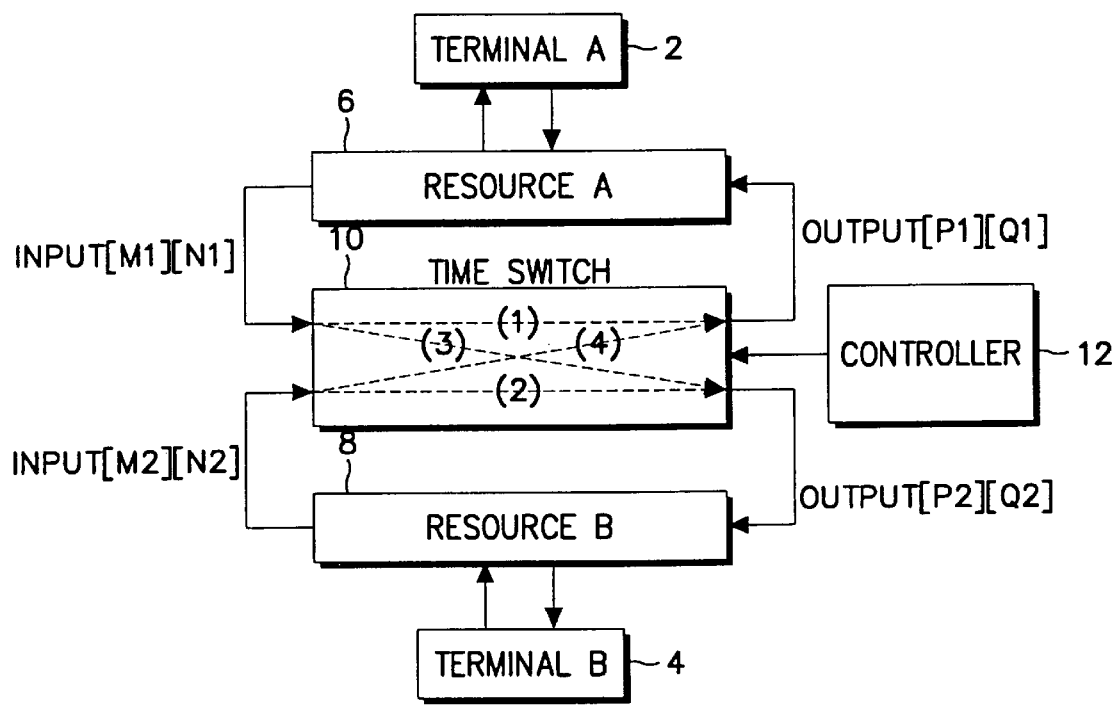
FIG. 2 is a block diagram showing a variable communication path according to an embodiment of the present invention.

FIG. 2 illustrates a block diagram showing that a communication channel is freely variable by the time switch 10 according to an embodiment of the present invention. As illustrated, time switch 10 receives the outputs from the first and second terminals 2 and 4 via the first and second resources 6 and 8 respectively, so as to freely switch a call path between the first terminal 2 and the second terminal 4.

The control of time switch 10 for diagnosing a failure on the call path will be described in detail hereinbelow according to an illustrative embodiment of the present invention.

First, it will be assumed in the specification that time switch 10 includes M input buses and P output buses, in which each of the input buses includes N channels, and each of the output buses includes Q channels. Then, an n-th channel of an m-th input bus can be represented by the following Equation (1).

$$\text{Input}[m][n], \text{ where } m \leq M, n \leq N \tag{1}$$

Further, a q-th channel of a p-th output bus can be represented by the following Equation (2).

$$\text{Output}[p][q], \text{ where } p \leq P, q \leq Q \tag{2}$$

Moreover, if a channel of the output bus is connected to a channel of the input bus, it can be expressed by the following Equation (3).

$$\text{Output}[p][q] = \text{Input}[m][n] \tag{3}$$

It should be understood that the block diagram shown in FIG. 2 are based on Equations (1) through (3). In view of the foregoing, when establishing a call from second terminal 4 to first terminal 2 or a call from first terminal 2 to second terminal 4, time switch 10 can be expressed by the following Equations (4a) and (4b), respectively.

$$\text{Output}[p1][q1] = \text{Input}[m2][n2] \tag{4a}$$

$$\text{Output}[p2][q2] = \text{Input}[m1][n1] \tag{4b}$$

In that case, first and second paths (1) and (2) shown time switch 10 are cut off, and third and fourth paths (3) and (4)

are connected. Therefore, the output of the first resource 6 is connected to the input of the second resource 8, and the output of the second resource 8 is connected to the input of the first resource 6. In the meantime, time switch 10 is switched as expressed by the following Equations (5a) and (5b).

$$\text{Output}[p1][q1]=\text{Input}[m1][n1] \quad (5a)$$

$$\text{Output}[p2][q2]=\text{Input}[m1][n1] \quad (5b)$$

In that case, the first and third paths (1) and (3) of time switch 10 are connected, and the second and fourth paths (2) and (4) are cut off. Therefore, the output of the first resource 6 is connected to the input of the second resource 8 and to the input of the first resource 6 itself, so that the call will circulate through first resource 6 itself and will be connected to the second resource 8 simultaneously. Thereafter, the time switch 10 is switched as expressed by the following Equations (6a) and (6b).

$$\text{Output}[p1][q1]=\text{Input}[m2][n2] \quad (6a)$$

$$\text{Output}[p2][q2]=\text{Input}[m2][n2] \quad (6b)$$

In this case, the second and fourth paths (2) and (4) of the switch 10 are connected, and the first and third paths (1) and (3) are cut off. Then, the output of the second resource 8 is connected to the input of the first resource 6 and to the input of the second resource 8 itself, so that the call will circulate through second resource 8 itself and simultaneously will be connected to the first resource 6 simultaneously.

Finally, time switch 10 is switched as expressed by the following Equations (7a) and (7b).

$$\text{Output}[p1][q1]=\text{Input}[m1][n1] \quad (7a)$$

$$\text{Output}[p2][q2]=\text{Input}[m2][n2] \quad (7b)$$

In this case, the first and second paths (1) and (2) of time switch 10 are connected, and the third and fourth paths (3) and (4) are cut off. Then, the output of the first resource 6 is connected to the input thereof, and the output of the second resource 8 is also connected the input thereof, so that the calls will circulate through the first and second resources 6 and 8 themselves.

Controller 12 controls time switch 10 in accordance with the above stated Equations (5) through (7), to form the variable call paths.

As can be clearly appreciated from the foregoing descriptions, time switch 10 can variably form call paths with respect to an established call. Accordingly, in case of a call failure, it is possible to predict and determine the position from which the failure originated. For example, although the calling terminal is connected to the called terminal, only the calling party may hear a voice from the called party, and the called party may not hear any voice (i.e., a unidirectional communication). In the case of such a unidirectional communication, time switch 10 connects the output of the calling party to the input of the calling party itself to check whether or not the calling party can hear their own voice. If the calling party can hear their voice, it is predicted that the call failure does not originate from the calling party, which means that the call path of the calling party is in a normal status. Then, time switch 10 connects the output of the called party to the input of the called party itself to check whether or not the called party can hear their voice. If the called party can not hear their voice, it is predicted that the call failure originated from the called party.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method of controlling a time switch placed between a first terminal and a second terminal to determine the origin of a call failure, said time switch switching a first resource associated with said first terminal and a second resource associated with the second terminal to establish a call, the method comprising the steps of:

(i.) connecting an output of the first resource through the time switch to an input of the first resource and simultaneously connecting an output of the first resource through the time switch to an input of the second resource, thereby generating first test data;

(ii.) connecting an output of the second resource through the time switch to an input of the second resource and simultaneously connecting an output of the second resource through the time switch to an input of the first resource, thereby generating second test data; and (iii.) using said first and second test data to determine the origination of a call failure.

2. The method for controlling a time switch according to claim 1, wherein said first terminal is a calling terminal and said second terminal is a called terminal.

3. The method of controlling a time switch according to claim 1, wherein said first arid second test data define one of normal and abnormal status of a call path defined by said connections.

* * * * *